Feb. 4, 1930.  J. S. PECK ET AL  1,745,865

ELECTRICAL PROTECTIVE DEVICE

Filed Oct. 16, 1922

WITNESSES:

INVENTORS
John S. Peck and
George E. Gittins.
BY
*Wesley G. Carr*
ATTORNEY

Patented Feb. 4, 1930

1,745,865

UNITED STATES PATENT OFFICE

JOHN S. PECK, OF ALTRINCHAM, AND GEORGE EDWARD GITTINS, OF MANCHESTER, ENGLAND, ASSIGNORS TO WESTINGHOUSE ELECTRIC AND MANUFACTURING COMPANY, A CORPORATION OF PENNSYLVANIA

ELECTRICAL PROTECTIVE DEVICE

Application filed October 16, 1922, Serial No. 594,726, and in Great Britain November 5, 1921.

This invention relates to protective devices for electric circuits and in particular to circuit-interrupting devices which are provided with what is commonly known as a no-voltage coil which causes the operation of the interrupter on a failure of, or an excessive reduction in, the voltage supplied to the circuit.

When a number of circuits are supplied from bus-bars which are connected to a source of electric supply through one or more feeders, circuit interrupters of relatively large breaking capacity are commonly provided on each incoming feeder, and breakers of smaller capacity on each of the consumers' circuits. If a fault occurs on such a system whereby an extremely heavy current is caused to circulate, it is desirable that the circuit should be interrupted by the large circuit-breaker or feeder interrupter and not by the smaller interrupter of a consumption circuit.

To attain this end, correct discrimination should be provided on the overload or other tripping devices of the main circuit-breaker and on the circuit-breakers connected to the consuming circuits. In cases where the tripping of the circuit-breaker is effected through the medium of current-transformer-operated coils only, no difficulty is encountered because all that is required is to provide an inverse-time-limit or high-overload setting on the main circuit-breaker and a suitable fixed-time-limit setting on the circuit interrupters of the several consumption circuits. If, however, a no-voltage coil is fitted on the consuming-circuit interrupters, which is a usual practice, the conditions will be somewhat altered, as it is generally undesirable to introduce an appreciable time delay in the operation of the no-voltage trip. The system may either be an insulated system or the neutral point may be connected to ground direct or through a limiting resistance and, in either case, a single or three-phase fault may reduce the terminal voltage of the consuming circuit sufficiently to cause the low-voltage device to act instantaneously and thus open the consuming-circuit interrupter before the main circuit-breaker on the feeders at the substation has operated. What is required, therefore, is an arrangement which will cause a consuming-circuit interrupter to operate if the voltage fails because of a failure of supply but which will not operate by reason of a fall of pressure which results from a heavy fault in said consumption circuit. In the latter case, the main circuit-breaker at the substation should operate and in the former case it should not.

With these objects in view, according to the present invention, the circuit interrupters on the consuming circuits are prevented from opening on no-voltage due to a short-circuit in the consuming circuit by combining with the no-voltage coil a series winding in such a manner that said coil will not operate as long as current flows through the circuit but will operate in the event of an interruption in supply, i. e. when there is neither voltage nor current available.

In carrying out the invention, various methods of energizing the series winding may be employed. In a single-phase circuit, only one series coil will, in general, be required. In a three-phase circuit, two or three series windings may be used or, where series transformers are used for energizing the said windings, the secondary windings of the transformers may be so connected as to enable a single series winding to be used on the no-voltage coil of a system not connected to earth or two series windings on a system of which the neutral wire is connected to earth.

In the accompanying drawings.

Figure 1:
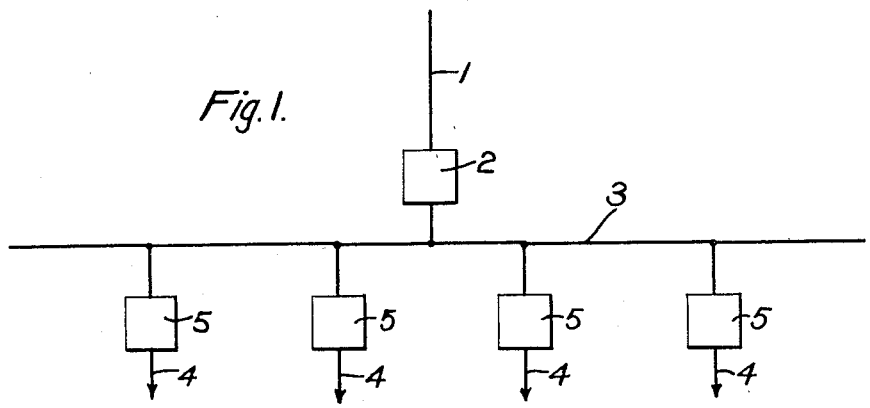
Fig. 1 is an electrical diagram showing the general arrangement of a number of circuits adapted to be supplied from a single source and provided with circuit interrupters to which the present invention is especially applicable.

Referring to Fig. 1, a supply circuit 1 is adapted to supply energy, through a main circuit-breaker 2, to bus-bars 3 from which a number of feeder circuits 4 are supplied, each feeder circuit being provided with a circuit-breaker 5 of such capacity as will be suitable for dealing with the energy requirements of the respective feeder circuits. The short-circuit capacities of the circuit-breakers 5 may be much smaller than that of the main circuit-breaker 2. In the diagram, the circuits are indicated by single lines for the sake of clearness. It will be understood, however, that either single-phase or polyphase circuits may be employed.

Figure 2:
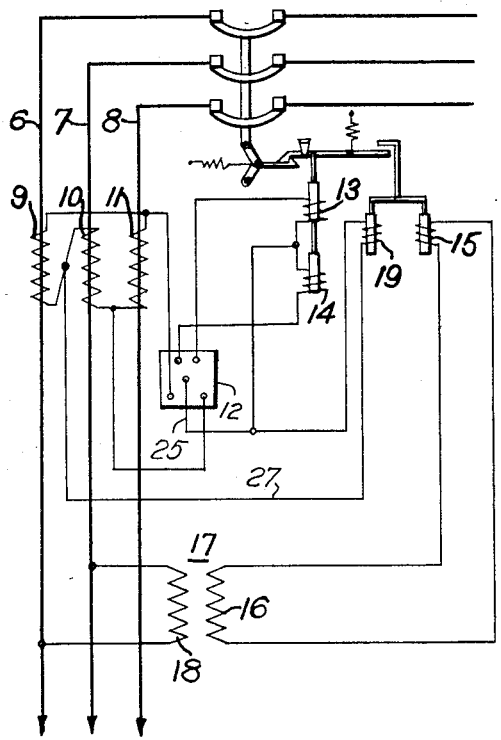
Fig. 2 is an electrical diagram of apparatus and circuits embodying our invention.

Fig. 2 shows, diagrammatically, the circuits and some of the operating coils of a circuit-breaker of a feeder circuit in accordance with the present invention. The phase conductors of a feeder circuit, indicated by the single lines 4 in Fig. 1, are here shown as three conductors 6, 7 and 8, the invention being illustrated as applied to a three-phase system. 9, 10 and 11 indicate the secondary windings of series transformers which are connected to a relay 12 having a fixed time limit and to trip coils 13 and 14 of the circuit-breaker in the usual manner, the well known Z method of connecting the secondaries 9 and 10 being employed so that two trip coils only are necessary. 15 is a no-voltage coil connected to the secondary winding 16 of a potential transformer 17, the primary winding 18 of which is connected to the phase conductors 6 and 7 and, as usual, the no-voltage coil is intended to cause the circuit-breaker to operate without appreciable delay when the voltage across the conductors 6 and 7 falls below a predetermined value. In order to prevent the no-voltage coil from operating by reason of a fall in pressure when a fault, resulting in a heavy current, occurs on the feeder circuit, a retaining winding 19 is provided which is included in series with the secondary windings 9 and 10 of the series transformers, said retaining winding being so arranged as to prevent the effective operation of the no-voltage coil so long as current is flowing in the conductors 6 and 7. Consequently, a fault to ground in either of these conductors will not cause the operation of the circuit breaker in the feeder circuit by reason of the possible fall in voltage on the no-voltage coil, and the circuit-breaker will be operated only after the expiration of the fixed time by reason of the excessive current in the windings of the relay 12. If the current due to the fault is heavy, the main circuit-breaker will operate before the feeder circuit-breaker operates, as hereinabove described.

Figure 4:
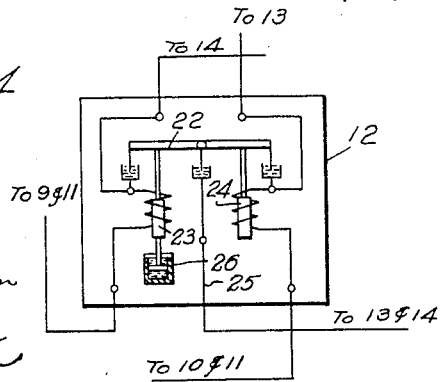
Fig. 4 is a schematic diagram illustrating the internal connections of the relay shown in Figs. 2 and 3.

Referring to Fig. 4, the relay 12 may be of any well-known type, here shown as comprising a pivoted armature 22 having three depending contact members disposed to cooperate with mercury-containing cups. The armature may be actuated to either of two limiting positions by means of plungers of magnetic material secured thereto and arranged to be actuated, respectively, by windings 23 and 24.

Under normal conditions, the armature is substantially horizontal, with the contact members in engagement with the mercury in the cups. In this position, the trip coils 13 and 14 are shunted by the armature and are, accordingly, in a deenergized condition. The current from the series transformers 9, 10 and 11 traverses the relay coils 23 and 24 and returns to the transformer bank by way of the conductor 25, the winding 19 and the conductor 27.

In the event of an overload, however, causing the required amount of current to traverse the winding 23 or the winding 24, the corresponding plunger will be raised, thereby breaking the associated mercury contact and permitting current to traverse either the actuating winding 13 or the actuating winding 14, as the case may be.

Any desired means may be associated with the relay armature or plungers to impart a desired time-element characteristic to the relay operation. Since such expedients are common and well known, a detailed description thereof is not deemed necessary. For purposes of clearness, however, a dash pot 26, associated with one of the actuating plungers of the armature 22, is shown in Fig. 4, and it is obvious that, when either of the windings 23 and 24 is sufficiently energized to actuate the armature 22, the dash pot will impart a definite time delay to the movement of the armature to circuit-opening position.

With the arrangements shown in Fig. 2, a fault to ground in the conductor 8 would not necessarily result in a current flowing in the retaining winding 19 but in such case it would seldom happen that the voltage between the conductors 6 and 8 would be reduced to the predetermined minimum. Consequently, the arrangement shown in this figure will operate successfully in connection with a very large percentage of the faults that may arise.

Figure 3:
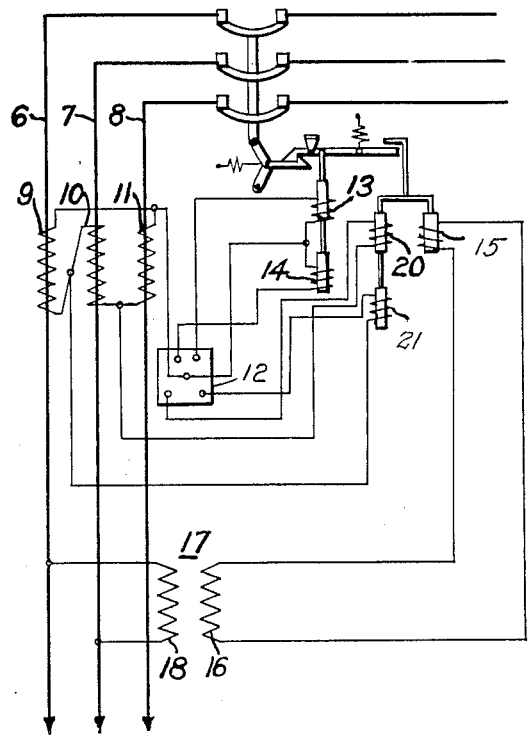
Fig. 3 is an electrical diagram of a modified combination of apparatus and circuits embodying our invention.

In Fig. 3, the arrangements shown are similar to those shown in Fig. 2 with the exception that two retaining windings 20 and 21 are provided in series with the trip coils 13 and 14. Consequently, when current is flowing in any of the conductors 6, 7 and 8, the one or the other or both of the retaining windings 20 and 21 will be energized and will prevent the operation of the no-voltage coil 15.

Both Figs. 2 and 3 show the arrangements applicable to three-phase circuits in which a neutral point of the system is connected to ground. The invention, however, is not limited to these particular arrangements, which are shown by way of example only, and methods of applying it to other polyphase systems and to single-phase systems will be apparent to the skilled engineer without further description.

We claim as our invention:

1. In an electric circuit, the combination with a circuit interrupter provided with a low-voltage device having an armature member for actuating the interrupter when the circuit voltage decreases to or below a predetermined value, of co-operating windings adjacent said armature member and respectively energized by the voltage of the circuit and by the current traversing the circuit for controlling the operation of said low-voltage device to cause the operation of said interrupter when a decrease in voltage on said circuit is accompanied by a decreased value of current.

2. In an electric circuit, the combination with a circuit interrupter provided with a low-voltage device that is instantaneously operative to actuate the interrupter when the circuit voltage decreases to or below a predetermined value, of means responsive to the circuit current for precluding the operation of the low-voltage device when the circuit current exceeds a predetermined value.

3. In an electric circuit, the combination with a circuit interrupter provided with a low-voltage device for actuating the interrupter when the circuit voltage decreases to or below a predetermined value, of means for controlling the operation of the low-voltage device according to whether the decrease in voltage is caused by a faulty condition in the circuit supplied or in a source of energy beyond the interrupter.

4. In an electric circuit, the combination with a circuit interrupter provided with a low-voltage device for actuating the interrupter when the circuit voltage decreases to or below a predetermined value, of means for precluding the operation of the low-voltage device if the decrease in voltage is caused by an abnormal condition on a predetermined portion of the circuit.

5. In an electric circuit, the combination with a circuit interrupter provided with a low-voltage device for actuating the interrupter when the circuit voltage decreases to or below a predetermined value, of means for controlling the operation of the low-voltage device according to whether the low-voltage condition is caused by an abnormal condition on the one side or the other of the circuit interrupter.

6. In an electric circuit, the combination with a circuit interrupter provided with a low-voltage device for actuating the interrupter when the circuit voltage decreases to or below a predetermined value, of means energized by the current traversing a predetermined portion of the circuit for precluding the operation of the low-voltage device if the decrease in voltage is caused by an abnormal condition in the portion of the circuit from which the said means are energized.

7. The combination with a circuit interrupter for an electric circuit, of a low-voltage device for controlling the actuation thereof comprising an element responsive to the circuit voltage and a co-operating element operative upon the occurrence of an excessive current in the circuit for preventing the operation of said voltage responsive element.

In testimony whereof, we have hereunto subscribed our names this 26th day of September, 1922.

JOHN S. PECK.
GEORGE EDWARD GITTINS.